US009833812B2

(12) United States Patent
Jeong et al.

(10) Patent No.: US 9,833,812 B2
(45) Date of Patent: Dec. 5, 2017

(54) VIBRATION GENERATING DEVICE

(71) Applicants: Samsung Electro-Mechanics Co., Ltd., Suwon-si (KR); Industry-University Cooperation Foundation Hanyang University, Seoul (KR)

(72) Inventors: Seung Hyeon Jeong, Suwon-si (KR); Hwa Young Oh, Suwon-si (KR); Gun Hee Jang, Seoul (KR); Ja Hyun Nam, Seoul (KR); Young Jin Kim, Seoul (KR)

(73) Assignees: MPLUS CO., LTD., Suwon-si, Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 379 days.

(21) Appl. No.: 14/637,600

(22) Filed: Mar. 4, 2015

(65) Prior Publication Data

US 2016/0074906 A1 Mar. 17, 2016

(30) Foreign Application Priority Data

Sep. 15, 2014 (KR) ........................ 10-2014-0121756

(51) Int. Cl.
*B60B 1/06* (2006.01)
*B06B 1/06* (2006.01)

(52) U.S. Cl.
CPC .................................. *B06B 1/0607* (2013.01)

(58) Field of Classification Search
CPC ...... B06B 1/0607; H01L 41/09; H01L 41/092
USPC ............................... 310/322, 323.01, 323.21
See application file for complete search history.

(56) References Cited

U.S. PATENT DOCUMENTS

2006/0119218 A1* 6/2006 Doshida .................. G02B 3/12 310/323.01
2012/0146433 A1* 6/2012 Jeong .................... H02K 33/16 310/25
2012/0212100 A1* 8/2012 Lee ...................... H01L 41/053 310/317

(Continued)

FOREIGN PATENT DOCUMENTS

JP 07-213997 A 8/1995
KR 10-2006-0000894 A 1/2006
KR 2006-0000894 A1 1/2006

(Continued)

OTHER PUBLICATIONS

English Translation of KR 10-20130035745, Kim.*

(Continued)

*Primary Examiner* — Bryan Gordon
(74) *Attorney, Agent, or Firm* — LRK Patent Law Firm

(57) ABSTRACT

There is provided a vibration generating device including: a housing having an internal space; a base member installed in the housing to be disposed in a central portion of the housing; a first plate installed on the base member; a first piezoelectric element installed on an upper surface of the first plate; a second piezoelectric element disposed to face the first piezoelectric element through a connection member; a second plate installed on the second piezoelectric element; and a vibration amplifying part installed on an upper surface of the second plate.

11 Claims, 6 Drawing Sheets

(56) References Cited

U.S. PATENT DOCUMENTS

| | | | | |
|---|---|---|---|---|
| 2013/0140956 A1* | 6/2013 | Mitani | G10K 9/122 310/334 |
| 2014/0346929 A1* | 11/2014 | Kim | H01L 41/0986 310/329 |

FOREIGN PATENT DOCUMENTS

| | | | |
|---|---|---|---|
| KR | 2011-0045486 | A1 | 5/2011 |
| KR | 2012-0017384 | A1 | 2/2012 |
| KR | 2013-0035745 | A1 | 4/2013 |
| KR | 2014-0072620 | A1 | 6/2014 |

OTHER PUBLICATIONS

English Translation of KR 10-20120075779, Lee.*

KIPO Office Action for Korean Patent Application No. 10-2014-0121756 which corresponds to the above-referenced U.S. application.

* cited by examiner

VIBRATION GENERATING DEVICE

CROSS-REFERENCE TO RELATED APPLICATION

This application claims the priority and benefit of Korean Patent Application No. 10-2014-0121756 filed on Sep. 15, 2014, with the Korean Intellectual Property Office, the disclosure of which is incorporated herein by reference.

BACKGROUND

The present disclosure relates to a vibration generating device.

Vibration generating devices, converting electric energy into mechanical vibrations through the generation of electromagnetic force, have commonly been mounted in mobile phones, and the like, in order to silently notify users of call reception by transferring vibrations thereto.

Meanwhile, recently, vibration generating devices using piezoelectric elements have been used. Such a vibration generating device using a piezoelectric element, relying on the principle of an inverse piezoelectric effect in which displacement is generated when voltage is applied to the piezoelectric element, uses the principle of allowing a mass body of a vibrator to be moved by the displacement generated by the piezoelectric element to generate vibration force.

Here, the piezoelectric element generally has a rectangular parallelepiped shape in which a length thereof is greater than a width thereof. However, in this case, since the piezoelectric element should be relatively long in order to secure displacement and vibrations, an overall length of the vibration generating device is increased, and the piezoelectric element is vulnerable to external impacts, such as those occurring in a case the device is dropped by a user.

In addition, since the vibration generating device has an overall rectangular parallelepiped shape, a volume thereof may be increased, which may not accord with the need for the miniaturization of components.

RELATED ART DOCUMENT (Patent Document 1) Korean Patent Laid-Open Publication No. 2006-0000894

SUMMARY

An aspect of the present disclosure may provide a vibration generating device having improved response characteristics.

According to an aspect of the present disclosure, a vibration generating device may include: a housing having an internal space; a base member installed in the housing to be disposed in a central portion of the housing; a first plate installed on the base member; a first piezoelectric element installed on an upper surface of the first plate; a second piezoelectric element disposed to face the first piezoelectric element through a connection member; a second plate installed on the second piezoelectric element; and a vibration amplifying part installed on an upper surface of the second plate.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
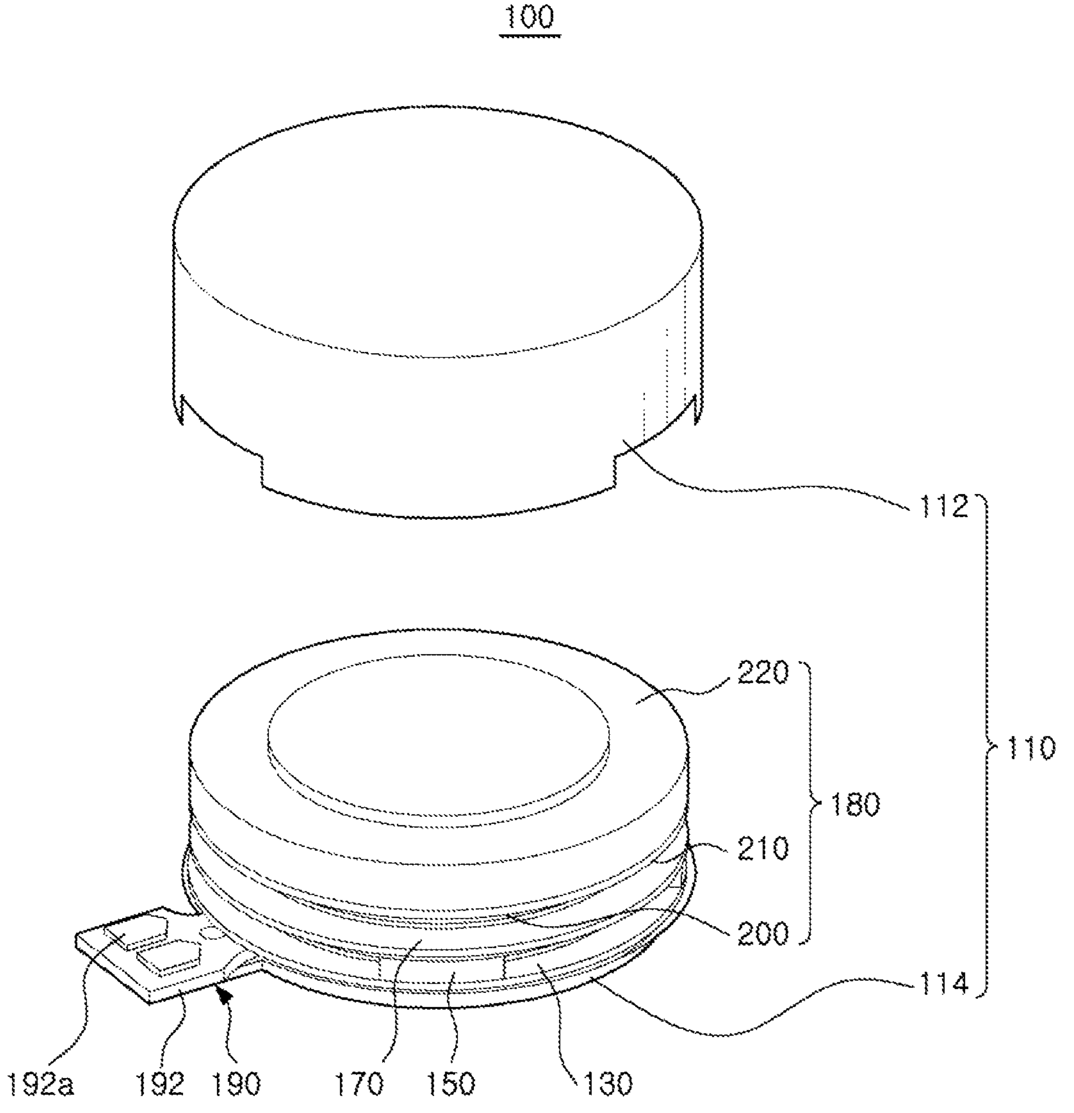
FIG. 1 is a schematic perspective view showing a vibration generating device according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
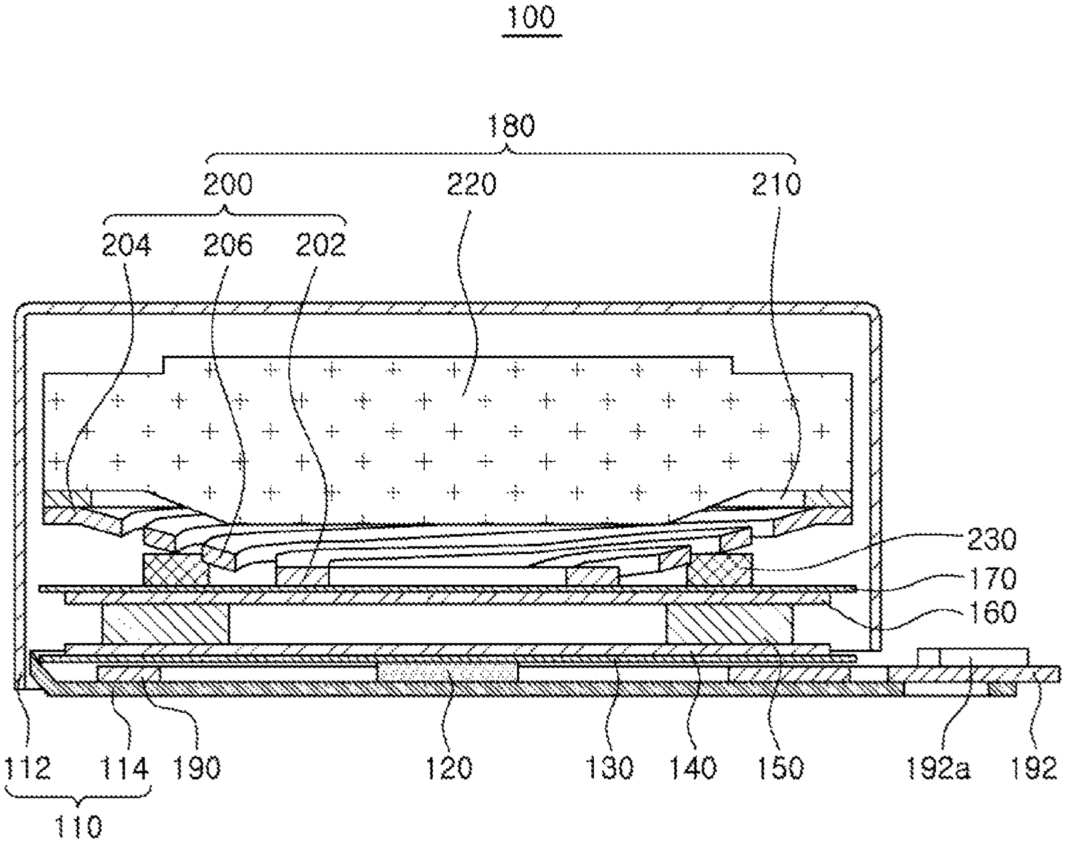
FIG. 2 is a schematic cross-sectional view showing the vibration generating device according to an exemplary embodiment of the present disclosure.

FIG. 1 is a schematic perspective view showing a vibration generating device according to an exemplary embodiment of the present disclosure; FIG. 2 is a schematic cross-sectional view showing the vibration generating device according to an exemplary embodiment of the present disclosure; and FIG. 3 is an exploded perspective view showing the vibration generating device according to an exemplary embodiment of the present disclosure.

Figure 3:
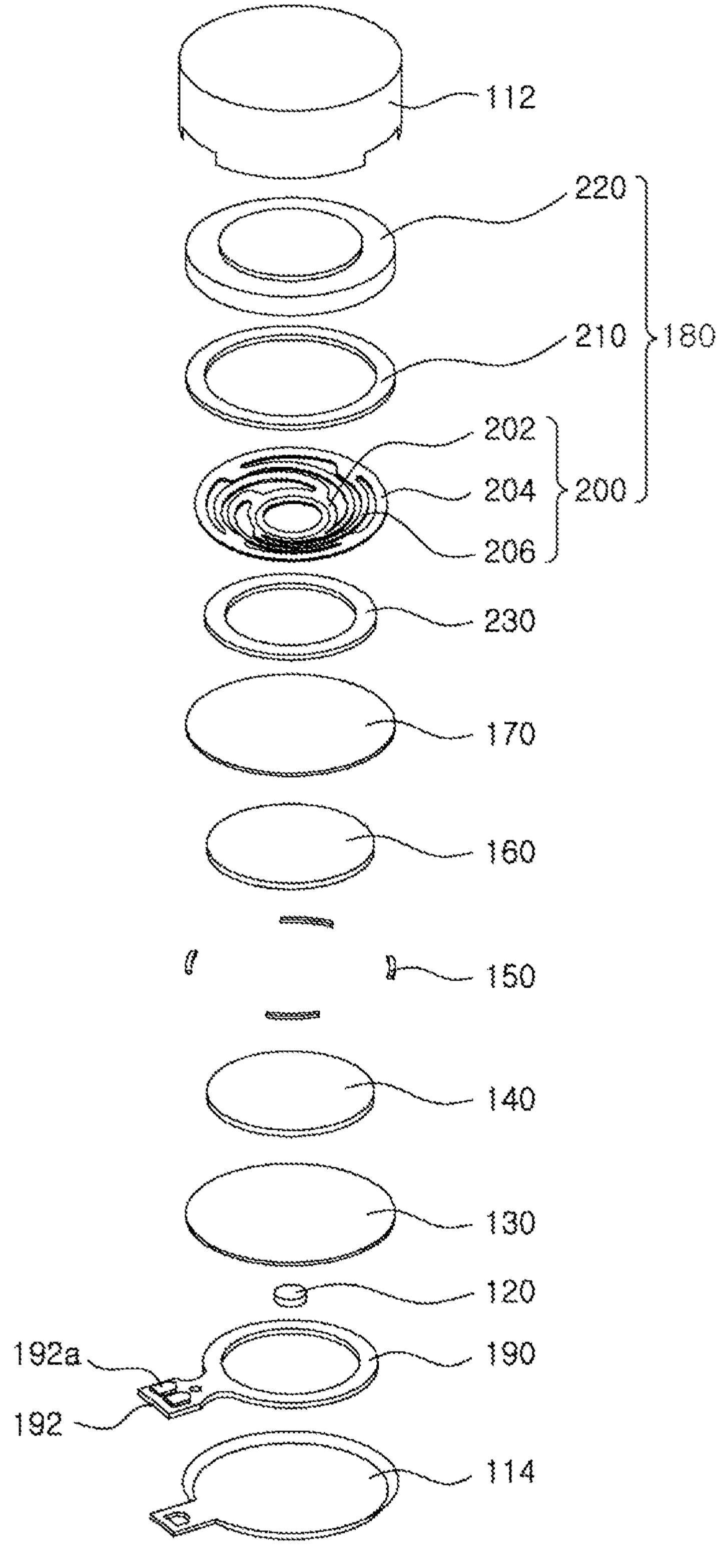
FIG. 3 is an exploded perspective view showing the vibration generating device according to an exemplary embodiment of the present disclosure.

Referring to FIGS. 1 through 3, a vibration generating device 100 according to an exemplary embodiment of the present disclosure may include a housing 110, a base member 120, a first plate 130, a first piezoelectric element 140, a connection member 150, a second piezoelectric element 160, a second plate 170, a vibration amplifying part 180, and a circuit board 190 by way of example.

The housing 110 may have an internal space and form an appearance of the vibration generating device 100.

Meanwhile, the housing 110 may include a case 112 having an internal space and having a lower end portion that is open and a bracket 114 coupled to the lower end portion of the case 112 to form a closed space, as shown in more detail in FIG. 2.

As an example, the case 112 may have a circular box shape of which a lower end portion is open, and the bracket 114 may have a plate shape coupled to the case 112.

As described above, the base member 120, the first plate 130, the first piezoelectric element 140, the connection member 150, the second piezoelectric element 160, the second plate 170, the vibration amplifying part 180, and the like, may be installed in the housing 110 having the internal space.

Although the case in which the housing 110 has a coin shape has been described by way of example in the present exemplary embodiment, a shape of the housing 110 is not limited thereto, but may be variously modified.

Here, terms with respect to directions will be defined. As viewed in FIG. 1, a radial direction refers to a horizontal direction, that is, a direction from an outer peripheral surface of the housing 110 to the center thereof or a direction from the center of the housing 110 toward the outer peripheral surface thereof, and a vertical direction refers to a direction from a bottom surface of the housing 110 toward a top surface thereof or a direction from the top surface of the housing 110 toward the bottom surface thereof.

In addition, a circumferential direction refers to a rotation direction along the outer peripheral direction of the housing 110.

The base member 120 may be installed in the housing 110 to be disposed in a central portion of the housing 110. As an example, the base member 120 may be fixedly installed on a central portion of the bracket 114.

Meanwhile, the base member 120 may have a coin shape and serve to allow the first plate 130 to be spaced apart from the bracket 114. That is, the first plate 130 may be installed on an upper surface of the base member 120 to thereby be disposed to be spaced apart from the bracket 114.

The first plate 130 may be fixedly installed on the upper surface of the base member 120, as described above, and have a disk shape. Meanwhile, the first plate 130 may be made of a metal. However, the first plate is not limited to being formed of the metal, but may be formed of any material as long as it may be restored to its original state after being deformed.

In addition, the first plate 130 may have a diameter larger than that of the first piezoelectric element 140.

In addition, the first piezoelectric element 140 may be installed on an upper surface of the first plate 130 and be deformed in the case in which power is applied thereto. In addition, the first piezoelectric element 140 may have a circular coin shape, and the first plate 130 may be deformed together with the first piezoelectric element 140 by deformation of the first piezoelectric element 140.

That is, since the first plate 130 has a central portion fixedly installed on the base member 120, when the first piezoelectric element 140 is deformed, an edge of the first plate 130 may be vertically deformed in a state in which the central portion of the first plate 130 is fixed.

In other words, the first plate 130 may be deformed to have a convex shape or a concave shape in a state in which the central portion thereof is fixed.

The connection member 150 may serve to connect the first and second piezoelectric elements 140 and 160 to each other so that the first and second piezoelectric elements 140 and 160 are disposed to face each other.

In addition, the connection member 150 may include a plurality of connection members 150 which are disposed to be spaced apart from each other in the circumferential direction at edges of the first and second piezoelectric elements 140 and 160.

Meanwhile, the connection members 150 may be formed of a material having restoring force by elastic deformation and having elasticity to allow the first and second piezoelectric elements 140 and 160 to be freely deformed at the time of deformation of the first and second piezoelectric elements 140 and 160 while suppressing a decrease in a deformation amount by the deformation of the first and second piezoelectric elements 140 and 160.

The second piezoelectric element 160 may have a circular coin shape and be deformed in an opposite direction to a direction in which the first piezoelectric is deformed when the first piezoelectric element is deformed. That is, in the case in which an edge of the first piezoelectric element 140 moves upwardly, such that the first piezoelectric element 140 is deformed to have a concave shape, the second piezoelectric element 160 may be deformed to have a convex shape. In addition, in the case in which the first piezoelectric element 140 is deformed to have a convex shape, the second piezoelectric element 160 may be deformed to have a concave shape.

Meanwhile, an edge of the second piezoelectric element 160 may be connected to the first piezoelectric element 140 by the connection members 150. Therefore, the edge of the second piezoelectric element 160 may be restricted to the first piezoelectric element 140, and a central portion thereof may be moved and deformed.

The second plate 170 may be installed on the second piezoelectric element 160 and have a disk shape. In addition, the second plate 170 may also be deformed together with the second piezoelectric element 160. In addition, the second plate 170 may also be made of a metal. In addition, the second plate 170 may have a diameter larger than that of the second piezoelectric element 160.

The vibration amplifying part 180 may be fixedly installed on an upper surface of the second plate 170 and serve to amplify vibrations generated by the deformation of the first and second piezoelectric elements 140 and 160.

Meanwhile, the vibration amplifying part 180 may include an elastic member 200, a yoke 210, and a mass body 220.

The elastic member 200 may have a central portion fixedly installed on the upper surface of the second plate 170 and an edge fixed to the yoke 210. To this end, the elastic member 200 may include a bonded installation portion 202 fixedly installed on the upper surface of the second plate 170, a ring portion 204 disposed outside of the bonded installation portion 202 and having a ring shape, and an elastic deformation portion 206 connecting the bonded installation portion 202 and the ring portion 204 to each other.

Meanwhile, the elastic deformation portion 206 may have a spiral shape, and the elastic deformation portion 206 may be provided in plural.

That is, in the case in which the first and second plates 130 and 170 are deformed by the deformation of the first and second piezoelectric elements 140 and 160, the bonded installation portion 202 of the elastic member 200 may move together with the second plate 170.

Therefore, the elastic deformation portions 206 of the elastic member 200 may be deformed to vertically move the mass body 220 installed on the ring portion 204.

The yoke 210 may have a lower surface fixedly installed on the ring portion 204 and have the mass body 220 seated on an upper surface thereof. To this end, the yoke 210 may have a ring shape. However, although the case in which the elastic member 200 and the mass body 220 are connected to each other through the yoke 210 has been described by way of example in the present exemplary embodiment, the present disclosure is not limited thereto. That is, the elastic member 200 may be directly installed on the mass body 220.

The mass body 220 may serve to amplify the vibrations generated by the deformation of the first and second piezoelectric elements 140 and 160. Meanwhile, the mass body 220 may also have a coin shape and be formed of a material having a high specific gravity in order to amplify the vibrations. For example, the mass body 220 may be formed of a material such as tungsten, iron, or the like.

In other words, in order to increase a vibration amount by adjusting a resonance frequency through an increase in a mass in the same volume, the weight 220 may be formed of the material having the high specific gravity.

In addition, a damper member 230 may be installed on the upper surface of the second plate 170 in order to prevent contact between the second plate 170 and the mass body 220. Meanwhile, the damper member 230 may have a ring shape and be formed of a material having elasticity in order to prevent noise and damage due to the contact between the mass body 220 and the second plate 170.

Meanwhile, in the case in which power is applied to the first and second piezoelectric elements 140 and 160, a frequency of a current applied to the first and second piezoelectric elements 140 and 160 may coincide with a resonant frequency of the vibration amplifying part 180. Therefore, in the case in which the power is applied to the first and second piezoelectric elements 140 and 160, the vibration amplifying part 180 may vibrate to amplify the vibrations by the deformation of the first and second piezoelectric elements 140 and 160.

The circuit board 190 may be connected to the first piezoelectric element 140 and have one end exposed from the housing 110. The circuit board 190 may be seated on the bracket 114, and have power connection electrodes 192*a* formed on a power connection part 192 thereof exposed from the housing 110.

Meanwhile, the circuit board 190 may be electrically connected to the second piezoelectric element 160.

As described above, since the first and second plates 130 and 170 are deformed by the deformation of the first and second piezoelectric elements 140 and 160, force transferred to the elastic member 200 may be amplified. Therefore, an operation speed may be improved as compared with a vibration generating device having the same diameter, such that rapid response characteristics may be secured.

In addition, the first and second piezoelectric elements 140 and 160 may be disposed to face each other without increasing a diameter of the piezoelectric element, such that a vibration amount may be increased without increasing a size of the vibration generating device 100.

Meanwhile, the first and second piezoelectric elements 140 and 160 may have the circular coin shape and the elastic member 200 may be provided, such that the size of the vibration generating device 100 may be further decreased.

Hereinafter, an operation of the vibration generating device according to an exemplary embodiment of the present disclosure will be described with reference to the accompanying drawings.

Figure 4:
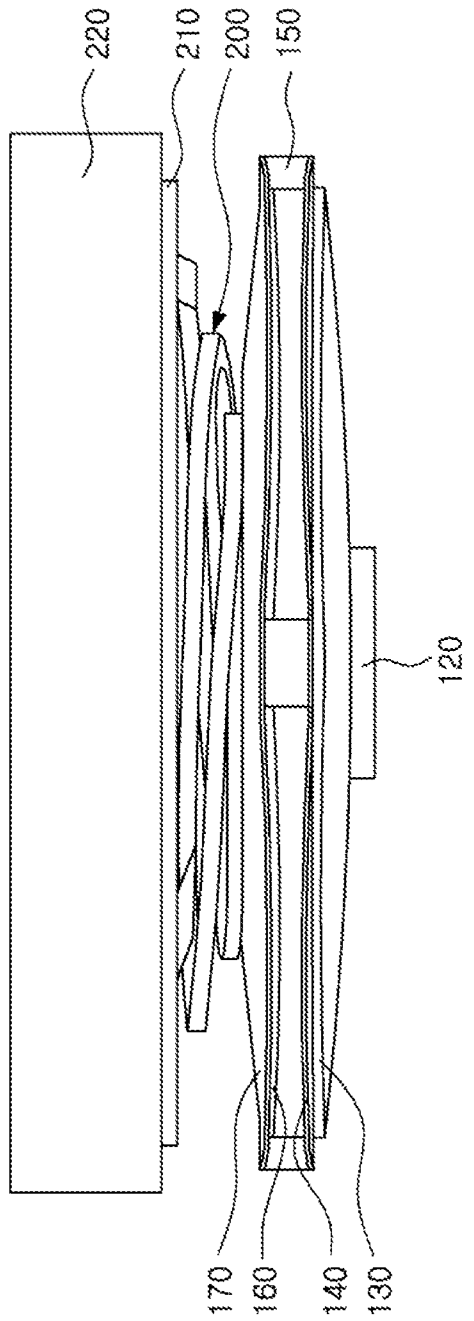
FIGS. 4 and 5 are views for describing an operation of the vibration generating device according to an exemplary embodiment of the present disclosure.
Figure 5:
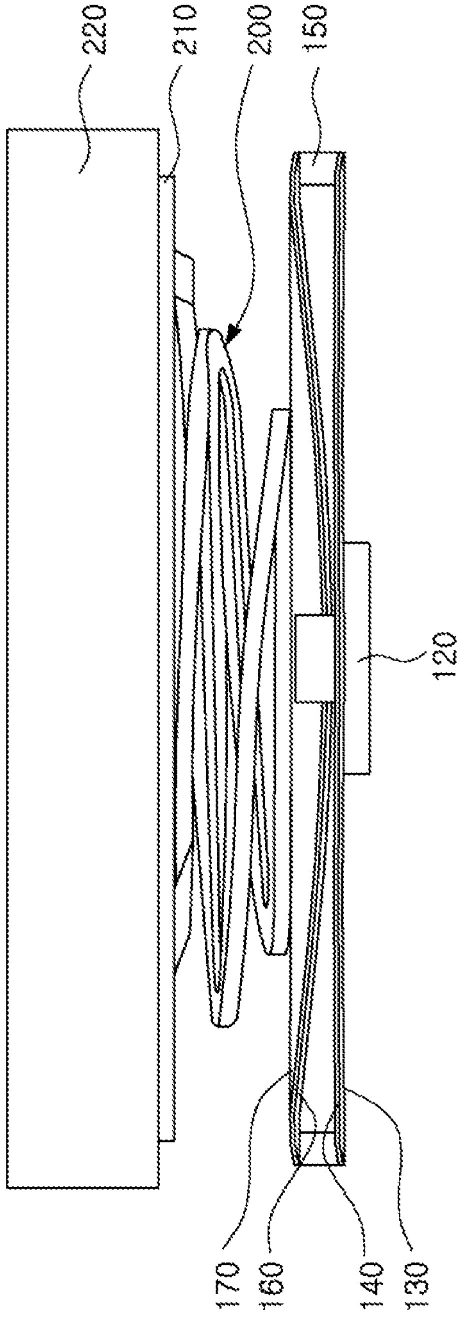

FIGS. 4 and 5 are views for describing an operation of the vibration generating device according to an exemplary embodiment of the present disclosure.

That is, FIG. 4 shows a state in which the vibration amplifying part of the vibration generating device according to an exemplary embodiment of the present disclosure moves upwardly, and FIG. 5 shows a state in which the vibration amplifying part of the vibration generating device according to an exemplary embodiment of the present disclosure moves downwardly.

First, referring to FIG. 4, when power is applied to the first piezoelectric element 140 through the circuit board 190 (See FIG. 3), the first piezoelectric element 140 may be deformed. Here, the first plate 130 having the central portion fixedly installed on the base member 120 may be deformed together with the first piezoelectric element 140.

That is, the edge of the first plate 130 may move upwardly in a state in which the central portion of the first plate 130 is fixed to the base member 120 by the deformation of the first piezoelectric element 140.

In other words, the first piezoelectric element 140 and the first plate 130 may be deformed to have a concave shape.

Here, the second piezoelectric element 160 may be deformed in an opposite direction to a direction in which the first piezoelectric element 140 is deformed. That is, in the case in which the first piezoelectric element 140 is deformed to have a concave shape, the second piezoelectric element 160 may be deformed to have a convex shape.

Meanwhile, the second piezoelectric element 160 may be disposed to face the first piezoelectric element 140 through the connection members 150 and be disposed to be spaced apart from the first piezoelectric element 140. Further, the second piezoelectric element 160 may be connected to the first piezoelectric element 140 by the connection members 150. In addition, the connection members 150 may be disposed to connect the edges of the first and second piezoelectric elements 140 and 160 to each other.

Therefore, when the second piezoelectric element 160 is deformed, the central portion of the second piezoelectric element 160 may be formed in a state in which the edge of the second piezoelectric element 160 is fixed to the connection members 150, such that the second piezoelectric element 160 may have a convex shape. Therefore, the second plate 170 may also be deformed to have a convex shape by the deformation of the second piezoelectric element 160.

As described above, the elastic deformation portion 206 of the elastic member 200 may be deformed by the deformation of the first and second piezoelectric elements 140 and 160.

Meanwhile, referring to FIG. 5, when power is applied to the first piezoelectric element 140 through the circuit board 190 (See FIG. 3), the first piezoelectric element 140 may be deformed. Here, the first plate 130 having the central portion fixedly installed on the base member 120 may be deformed together with the first piezoelectric element 140.

That is, the edge of the first plate 130 may move upwardly in a state in which the central portion of the first plate 130 is fixed to the base member 120 by the deformation of the first piezoelectric element 140.

In other words, the first piezoelectric element 140 and the first plate 130 may be deformed to have a convex shape.

Here, the second piezoelectric element 160 may be deformed in an opposite direction to a direction in which the first piezoelectric element 140 is deformed. That is, in the case in which the first piezoelectric element 140 is deformed to have a convex shape, the second piezoelectric element 160 may be deformed to have a concave shape.

Meanwhile, the second piezoelectric element 160 may be disposed to face the first piezoelectric element 140 through the connection members 150 and be disposed to be spaced apart from the first piezoelectric element 140. Further, the second piezoelectric element 160 may be connected to the first piezoelectric element 140 by the connection members 150. In addition, the connection members 150 may be disposed to connect the edges of the first and second piezoelectric elements 140 and 160 to each other.

Therefore, when the second piezoelectric element 160 is deformed, the central portion of the second piezoelectric element 160 may be formed in a state in which the edge of the second piezoelectric element 160 is fixed to the connection members 150, such that the second piezoelectric element 160 may have a concave shape. Therefore, the second plate 170 may also be deformed to have a concave shape by the deformation of the second piezoelectric element 160.

As described above, the elastic deformation portion 206 of the elastic member 200 may be deformed by the deformation of the first and second piezoelectric elements 140 and 160.

As described above, since the first and second plates 130 and 170 are deformed by the deformation of the first and second piezoelectric elements 140 and 160, force transferred to the elastic member 200 may be amplified. Therefore, an operation speed may be improved as compared with a vibration generating device having the same diameter, such that rapid response characteristics may be secured.

Hereinafter, a vibration generating device according to another exemplary embodiment of the present disclosure will be described with reference to FIG. 6. However, the same components as the above-mentioned components will be denoted by the same reference numerals and a detailed description therefor will be omitted.

Figure 6:
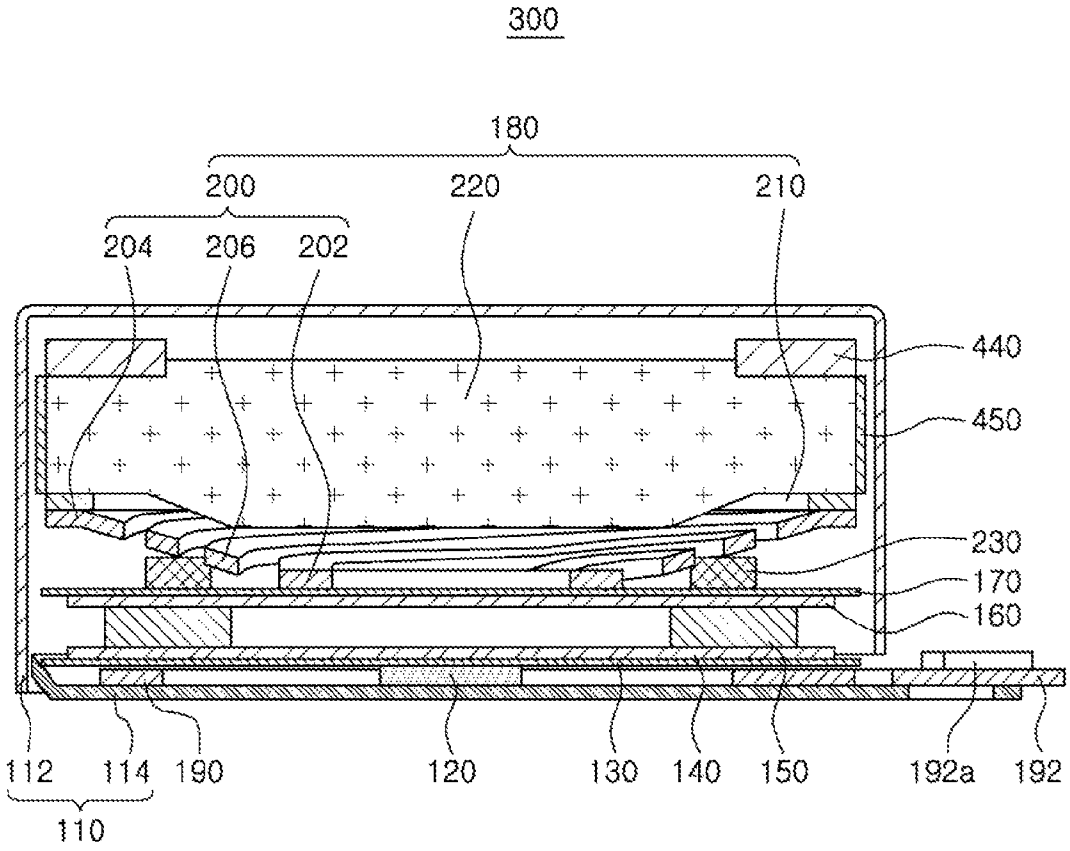
FIG. 6 is a schematic cross-sectional view showing a vibration generating device according to another exemplary embodiment of the present disclosure.

FIG. 6 is a schematic cross-sectional view showing a vibration generating device according to another exemplary embodiment of the present disclosure.

Referring to FIG. 6, a vibration generating device 300 according to another exemplary embodiment of the present disclosure may further include first and second contact prevention members 440 and 450.

The first contact prevention member 440 may be installed on at least one of an upper surface of the mass body 220 and a ceiling surface of the housing 110, serve to prevent generation of noise due to contact between the housing 110 and the mass body 220, and prevent damage to the housing 110 in the case in which the housing 110 and the mass body 220 contact each other due to external impact.

Meanwhile, the second contact prevention member 450 may be installed on at least one of an outer peripheral surface of the mass body 220 and an inner peripheral surface of the housing 110 and prevent contact between the housing 110 and the mass body 220 generated at the time of tilting of the mass body 220 to prevent generation of noise. Further, the second contact prevention member 450 may also prevent damage to the housing 110 in the case in which the housing 110 and the mass body 220 contact each other due to external impact.

As set forth above, according to exemplary embodiments of the present disclosure, response characteristics may be improved.

While exemplary embodiments have been shown and described above, it will be apparent to those skilled in the art that modifications and variations could be made without departing from the scope of the present invention as defined by the appended claims.

What is claimed is:

1. A vibration generating device comprising:

a housing having an internal space;

a base member installed in the housing and disposed at a central portion of the housing;

a first plate installed on the base member, the base member being disposed at a central portion of the first plate;

a first piezoelectric element installed on an upper surface of the first plate;

a connection member installed on the first piezoelectric element and disposed in a circumferential direction at an edge of the first piezoelectric element;

a second piezoelectric element installed on the connection member and disposed to face the first piezoelectric element with an edge of the second piezoelectric element being connected to the edge of the first piezoelectric element through the connection member;

a second plate installed on the second piezoelectric element; and a vibration amplifying part installed on an upper surface of the second plate, wherein when the first piezoelectric element is deformed, the first plate is vertically deformed at an edge portion thereof with the central portion thereof being fixed to the base member.

2. The vibration generating device of claim 1, wherein the vibration amplifying part includes:

an elastic member of which one end is fixedly installed on a central portion of the second plate; and a mass body which is connected to another end of the elastic member.

3. The vibration generating device of claim 2, wherein the vibration amplifying part further includes a yoke to which an edge of the elastic member is fixed and which is provided to fix the mass body.

4. The vibration generating device of claim 2, further comprising a damper member installed on the upper surface of the second plate and preventing contact between the second plate and the mass body.

5. The vibration generating device of claim 2, wherein the elastic member includes:

a bonded installation portion fixedly installed on the upper surface of the second plate;

a ring portion disposed outside of the bonded installation portion and having a ring shape; and an elastic deformation portion connecting the bonded installation portion and the ring portion to each other.

6. The vibration generating device of claim 1, further comprising a circuit board connected to the first piezoelectric element and having one end which is exposed externally from the housing.

7. The vibration generating device of claim 6, wherein the circuit board is electrically connected to the first and second piezoelectric elements.

8. The vibration generating device of claim 7, wherein the connection member comprises a plurality of connection pieces which are disposed in the circumferential direction at the edges of the first and second piezoelectric elements, the plurality of connection pieces being spaced apart from each other.

9. The vibration generating device of claim 1, wherein when the first piezoelectric element is deformed in one direction, the second piezoelectric element is deformed in an opposite direction.

10. The vibration generating device of claim 2, further comprising:

a first contact prevention member installed on at least one of an upper surface of the mass body and a ceiling surface of the housing in order to prevent contact between the mass body and the housing, and a second contact prevention member installed on at least one of an outer peripheral surface of the mass body and an inner peripheral surface of the housing in order to prevent contact between the mass body and the housing when the mass body is tilted.

11. A vibration generating device comprising:

a housing including a case and a bracket, the case having an internal space and having a lower end portion that is open, and the bracket coupled to the lower end portion of the case to form a closed space;

a base member fixedly installed on the bracket and disposed at a central portion of the bracket;

a first plate installed on the base member which is disposed at a central portion of the first plate;

a first piezoelectric element installed on an upper surface of the first plate;

a connection member installed on the first piezoelectric element and disposed in a circumferential direction at an edge of the first piezoelectric element;

a second piezoelectric element installed on the connection member and disposed to face the first piezoelectric element with an edge of the second piezoelectric element being connected to the edge of the first piezoelectric element through the connection member;

a second plate installed on the second piezoelectric element;

an elastic member of which one end is fixedly installed on a central portion of the second plate; and a mass body connected to another end of the elastic member, wherein when the first piezoelectric element is deformed, the first plate is vertically deformed at an edge portion thereof with the central portion thereof being fixed to the base member.

* * * * *